United States Patent
Jeong et al.

(10) Patent No.: US 8,539,236 B2
(45) Date of Patent: Sep. 17, 2013

(54) RE-AUTHENTICATION APPARATUS AND METHOD IN DOWNLOADABLE CONDITIONAL ACCESS SYSTEM

(75) Inventors: Young Ho Jeong, Daejeon (KR); Eun Jung Kwon, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 729 days.

(21) Appl. No.: 12/692,266

(22) Filed: Jan. 22, 2010

(65) Prior Publication Data

US 2011/0078444 A1    Mar. 31, 2011

(30) Foreign Application Priority Data

Sep. 29, 2009   (KR) .................. 10-2009-0092395

(51) Int. Cl.
    *H04L 29/06*   (2006.01)
(52) U.S. Cl.
    USPC .......................................... 713/170; 713/155
(58) Field of Classification Search
    USPC ...... 713/168–171; 726/26–30; 380/278–284
    See application file for complete search history.

(56) References Cited

U.S. PATENT DOCUMENTS

| | | | |
|---|---|---|---|
| 6,246,767 B1 | 6/2001 | Akins, III et al. | |
| 8,166,298 B2 * | 4/2012 | Kim et al. | 713/169 |
| 8,243,927 B2 * | 8/2012 | Taniguchi | 380/239 |
| 8,265,269 B2 * | 9/2012 | Nishida et al. | 380/43 |
| 8,266,429 B2 * | 9/2012 | Helms et al. | 713/165 |
| 8,291,053 B2 * | 10/2012 | Kim et al. | 709/222 |
| 8,370,619 B2 * | 2/2013 | Park et al. | 713/2 |
| 2005/0182932 A1 * | 8/2005 | Wheeler | 713/168 |
| 2007/0265967 A1 * | 11/2007 | Kahn et al. | 705/51 |
| 2008/0098212 A1 * | 4/2008 | Helms et al. | 713/155 |
| 2008/0177998 A1 * | 7/2008 | Apsangi et al. | 713/155 |
| 2009/0138720 A1 * | 5/2009 | Jeong et al. | 713/176 |
| 2009/0144539 A1 * | 6/2009 | Jeong et al. | 713/155 |
| 2009/0150672 A1 * | 6/2009 | Kwon et al. | 713/169 |
| 2009/0150673 A1 | 6/2009 | DeFreese et al. | |
| 2009/0158395 A1 * | 6/2009 | Jeong et al. | 726/3 |
| 2010/0146116 A1 * | 6/2010 | Jeong et al. | 709/225 |

FOREIGN PATENT DOCUMENTS

| | | |
|---|---|---|
| KR | 10-2009-0057587 | 6/2009 |
| KR | 10-2009-0066178 | 6/2009 |
| KR | 1020090060528 | 6/2009 |

* cited by examiner

*Primary Examiner* — Ali S Abyaneh
*Assistant Examiner* — Phy Anh Vu
(74) *Attorney, Agent, or Firm* — Nelson Mullins Riley & Scarborough LLP

(57) ABSTRACT

Provided is a re-authentication apparatus in a Downloadable Conditional Access System (DCAS), the re-authentication apparatus includes: a receiving unit to receive a key request message from a Secure Micro (SM); a determination unit to determine whether to perform re-authentication depending on downloading of SM client image; an identification unit to identify an SM identifier using the key request message, when the re-authentication is performed as a result of the determination; an extraction unit to retrieve previous session information corresponding to the SM identifier and to extract keying information about the previous session information; and an encryption unit to control an encryption key about the SM client image to be reused, the SM client image being encrypted in a previous session based on the previous session information using the keying information.

12 Claims, 6 Drawing Sheets

RE-AUTHENTICATION APPARATUS AND METHOD IN DOWNLOADABLE CONDITIONAL ACCESS SYSTEM

CROSS-REFERENCE TO RELATED APPLICATION

This application claims the benefit of Korean Patent Application No. 10-2009-0092395, filed on Sep. 29, 2009, in the Korean Intellectual Property Office, the disclosure of which is incorporated herein by reference.

BACKGROUND

1. Field of the Invention

The present invention relates to a fast re-authentication apparatus and method based on a Downloadable Conditional Access System (DCAS) protocol.

2. Description of the Related Art

A Conditional Access System (CAS) in a cable network may determine whether to provide a service based on subscriber authentication and enable only authorized subscriber to be provided with a particular program, when a service subscriber desires to view the program.

In a conventional CAS, a conditional access module, separated from a receiver, has been generally used. For example, a CableCARD such as a Personal Computer Memory Card International Association (PCMCIA) card has been used. However, the conditional access module may not be widely used due to an increase in CableCARD prices, an increase in management costs, and a lack of stimulation in a receiver market.

Currently, a Downloadable CAS (DCAS) is provided. In a DCAS, a service provider may enable a subscriber terminal to download a variety of conditional access software such as a Secure Micro (SM) client image, using an existing cable network without a separate hardware conditional access module, and thus a fee-based broadcasting service may be provided.

A DCAS may include a DCAS headend system and a DCAS host. A DCAS host may be a subscriber terminal, and a DCAS headend system may manage download of an SM client image based on mutual authentication.

In this instance, when a number of DCAS hosts are simultaneously connected to a network, or when a performance upgrade of an SM client image and an image update due to hacking occur, an authentication event for downloading the SM client image may simultaneously occur in a number of DCAS hosts, and an overload may occur in a DCAS authentication proxy.

Accordingly, a method that may prevent an overload in a DCAS authentication proxy and quickly provide a download service of SM client image is required.

SUMMARY

According to an aspect of the present invention, there is provided a re-authentication apparatus in a Downloadable Conditional Access System (DCAS), the re-authentication apparatus including: a receiving unit to receive a key request message from a Secure Micro (SM); a determination unit to determine whether to perform re-authentication depending on downloading of an SM client image; an identification unit to identify an SM identifier using the key request message, when the re-authentication is performed as a result of the determination; an extraction unit to retrieve previous session information corresponding to the SM identifier and to extract keying information about the previous session information; and an encryption unit to control an encryption key about the SM client image to be reused, the SM client image being encrypted in a previous session based on the previous session information using the keying information.

According to another aspect of the present invention, there is provided a re-authentication apparatus in a DCAS, the re-authentication apparatus including: a receiving unit to receive a Security Announcement (SA) message or a DCAS Download (DD) message from an Authentication Proxy (AP); a determination unit to determine whether to download an SM client image, when the SA message or the DD message is received; an extraction unit to extract a first IHK and an AP identifier about previous session information, when the SM client image is required to be downloaded; and a transmission unit to transmit the first IHK about the previous session information to the AP corresponding to the extracted AP identifier, wherein the receiving unit downloads the SM client image using the first IHK and a second IHK received from the AP.

According to an aspect of the present invention, there is provided a re-authentication method in a DCAS, the re-authentication method including: receiving a key request message from an SM; determining whether to perform re-authentication depending on downloading of an SM client image; identifying an SM identifier using the key request message, when the re-authentication is performed as a result of the determination; retrieving previous session information corresponding to the SM identifier and extracting keying information about the previous session information; and controlling an encryption key about the SM client image to be reused, the SM client image being encrypted in a previous session based on the previous session information using the keying information.

According to another aspect of the present invention, there is provided a re-authentication method in a DCAS, the re-authentication method including: receiving an SA message or a DD message from an AP; determining whether to download an SM client image, when the SA message or the DD message is received; extracting a first IHK and an AP identifier about previous session information, when the SM client image is required to be downloaded; transmitting the first IHK about the previous session information to the AP corresponding to the extracted AP identifier; and downloading the SM client image using the first IHK and a second IHK received from the AP.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When detailed descriptions related to a well-known related function or configuration are determined to make the spirit of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

Figure 1:
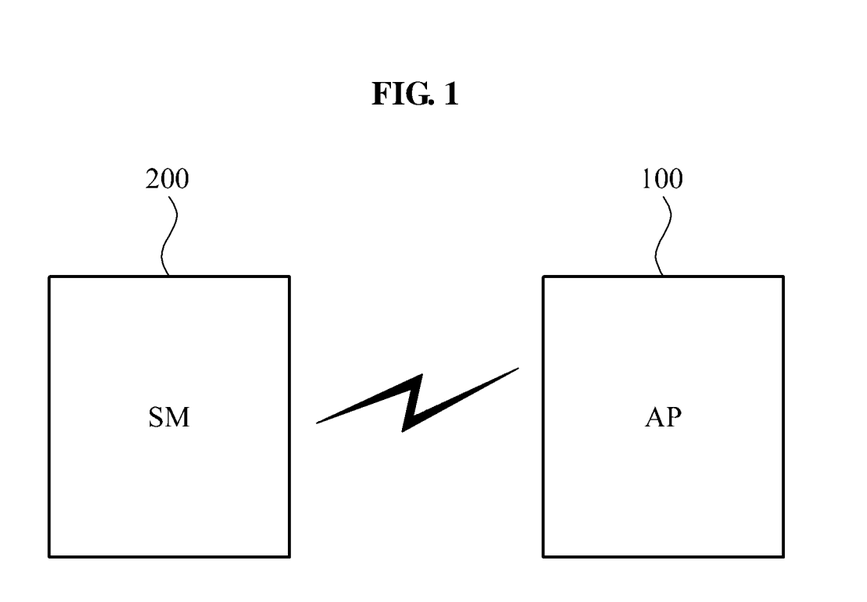
FIG. 1 is a block diagram illustrating a configuration of a Downloadable Conditional Access System (DCAS) according to an embodiment of the present invention.

FIG. 1 is a block diagram illustrating a configuration of a Downloadable Conditional Access System (DCAS) according to an embodiment of the present invention.

According to an embodiment of the present invention, a DCAS protocol between an Authentication Proxy (AP) and a Secure Micro (SM) may include four sub-protocols, an announcement protocol, a keying protocol, an authentication protocol, and a download protocol. A message process operation in each of the sub-protocols is described in detail.

According to an embodiment of the present invention, the announcement protocol may include an operation of processing a Security Announcement (SA) message and a DCAS Download (DD) message. The AP may generate an authentication code for the SA message using a common Hashed Message Authentication Code (HMAC) Key (CHK) based on a HMAC-Secure Hash Algorithm (HMAC-SHA) 1 scheme, and transmit the SA message to the SM in a multicast transmission.

In this instance, the SA message may determine whether the SM initially installs or updates an SM client image. Also, the SA message may provide connection information about the AP.

Also, the AP may deliver the SM information about a time to download the SM client image, an update of a key, a request for purchase information, and the like, using the DD message.

According to an embodiment of the present invention, the keying protocol may include an operation of processing a key request message and a key response message. Also, the keying protocol may perform authentication with respect to an HMAC-SHA1 message using the CHK stored in the SM receiving the SA message.

However, when the SM is in a virgin state, moves into an AP zone, or is required to update the CHK, the SM performs the keying protocol, and obtains and updates the CHK.

Also, to perform the keying protocol, the SM may sign the key request message using a private key of the SM, and transmit the key request message to the AP. In this instance, the key request message may include a session identifier (Session_ID), pairing information between the SM and a multi-descrambler chip, and an SM certificate (Cert(SM)). The session identifier may be randomly generated by the SM.

The AP may verify the received SM certificate and perform signature verification with respect to the received key request message. When the signature is verified, the AP may generate a key request message including a key pairing identifier (Key_Pairing_ID) and a unique AP identifier (AP_Unique_ID), and transmit the generated key request message to a Trusted Authority (TA).

The TA receiving the key request message may query and verify the SM certificate using the key pairing identifier, and thereby may start authentication with respect to the SM.

When verification with respect to the SM certificate and a pairing value are successful, the TA may include a factor, required to generate an encryption key about the SM client image and a message, and keying information required to form a security channel between the SM and the multi-descrambler, in the key response message, and transmit the key response message to the AP.

The AP may generate an Individual HMAC Key (IHK) and a CHK required to process the HMAC-SHA 1, and add the generated IHK and CHK and an AP certificate to the key response message. Sequentially, the AP may encrypt a key-related factor using a public key of the SM, perform a digital signing using a private key of the AP, and transmit the key response message to the SM.

The SM receiving the key response message may obtain the AP certificate, verify the AP certificate, and perform signature verification with respect to the key response message. Also, the SM may decrypt the key-related factor, included in the key response message, using the private key of the SM. In this instance, the SM may obtain the CHK and the IHK required to process the HMAC-SHA 1.

According to an embodiment of the present invention, the authentication protocol may include an operation of processing a ClientSignOn message and a ClientSignOnConfirm message. The SM may generate a message encryption key and an individual SM client image encryption key, using a value of factor required to generate a key included in the key request message.

The SM may add a hash value with respect to the message encryption key and the individual SM client image encryption key of the SM, to the ClientSignOn message in order to confirm whether the AP generates the same message encryption key and individual SM client image encryption key. Also, the SM may apply the HMAC-SHA 1 to the message for message authentication to the ClientSignOn message using the IHK, received from the AP, and may transmit the ClientSignOn message to the AP.

The AP receiving the ClientSignOn message may perform the HMAC-SHA 1 message authentication using the IHK.

The AP may determine whether encryption keys, generated by the AP, are identical to the encryption keys, generated by the SM, using the hash value included in the ClientSignOn message.

When the encryption keys, generated by the AP, are identical to the encryption keys generated by the SM, the AP may transmit the ClientSignOnConfirm message to the SM.

Also, the transmitted ClientSignOnConfirm message may include the HMAC-SHA 1 message authentication code using the IHK, encrypt a session identifier (Session_ID), a common SM client image encryption key, and related Initial Vectors (IVs) using an Advanced Encryption Standard (AES) algorithm, and the AP may transmit the ClientSignOnConfirm message to the SM.

According to an embodiment of the present invention, the download protocol may include an operation of processing a DownloadInfo message and a DownloadConfirm message. The AP may include, in the DownloadInfo message, information required to enable an authenticated SM to download and install the SM client image, and transmit the DownloadInfo message to the SM.

The transmitted DownloadInfo message may include the HMAC-SHA 1 message authentication code using the IHK, be encrypted using the message encryption key and corresponding IV based on the AES algorithm, and transmit the DownloadInfo message to the SM.

The SM may receive the DownloadConfirm message and perform a message authentication and a decryption with respect to the DownloadConfirm message. Also, the SM may download the SM client image from a download server, storing the SM client image, using information in the received DownloadConfirm message.

Since the downloaded SM client image is encrypted based on the AES algorithm using a common and individual SM client image encryption key and the IV, the SM may decrypt the SM client image using shared encryption-related keying information. The SM may install the SM client image and transmit the DownloadConfirm message to the AP.

According to an embodiment of the present invention, the re-authentication apparatus in a DCAS may selectively perform protocols based on the above-described four DCAS protocols and download the SM client image through a simple authentication process. Accordingly, the re-authentication apparatus may securely and quickly transmit purchase information of a DCAS host.

Figure 2:
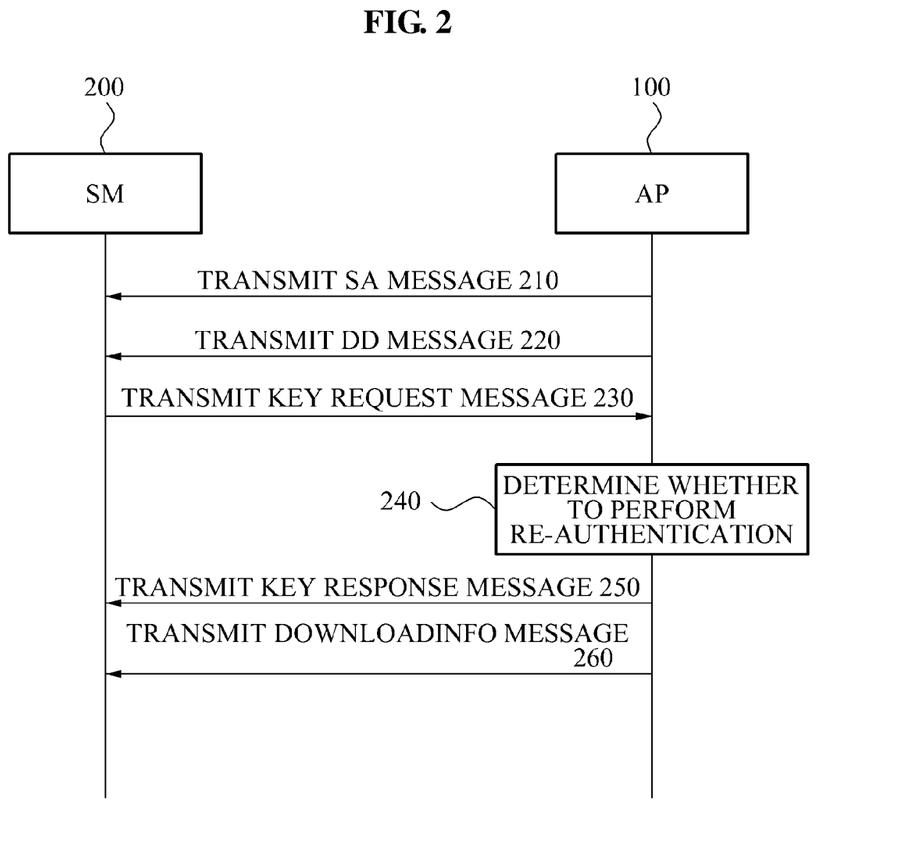
FIG. 2 is a flowchart illustrating a DCAS protocol operation according to an embodiment of the present invention.

FIG. 2 is a flowchart illustrating a DCAS protocol operation according to an embodiment of the present invention.

Operations of a re-authentication apparatus in a DCAS according to an embodiment of the present invention are described in detail with reference to FIG. 2.

In operation 210, the AP 100 may transmit an SA message to the SM 200. In operation 220, the AP 100 may transmit a DD message to the SM 200.

In operation 230, the SM 200 may add a hash value 'H(Prev_IHK)' of an IHK of a previous session (Prev_IHK) to a key request message, and transmit the key request message to the AP 100. The IHK of the previous session may be information for a previous session associated with the AP 100.

In operation 240, the AP 100 may determine whether an authentication event for downloading an SM client image occurs, and determine whether to perform fast re-authentication or general authentication.

In operation 250, when the fast re-authentication is determined to be performed, the AP 100 may identify an SM identifier (SM_ID) using a key pairing identifier (Key_Pairing_ID) and the hash value 'H(Prev_IHK)', retrieve previous session information, extract related keying information, and transmit a key response message to the SM 200.

That is, an operation of processing the key request message and key response message with a TA and an operation of processing a ClientSignOn message and a ClientSignOnConfirm message with the SM 200 may be removed. Accordingly, the AP 100 may efficiently reduce a system load due to generation of related keys and message processing.

In operation 260, the AP 100 may reuse IVs associated with encryption, and encryption keys with respect to a DownloadInfo message, a DownloadConfirm message, and the SM client image, the messages being generated in a previous session, may newly generate an IHK, may perform encryption for the IHK, and may transmit the key response message with encrypted IHK to the SM 200.

In this instance, the SM 200 may perform signature verification with respect to a corresponding message using a certificate of the AP 100 'Cert(AP)' received in advance and stored. Accordingly, the AP 100 may not be required to transmit the certificate of the AP 100 to the SM 200.

Also, a configuration of the key request message and the key response message for fast re-authentication is provided as an example.

TABLE 1 configuration of key request message and key response message

| Message | Configuration of message |
|---|---|
| Key Request | MHdr ‖ Mcnt ‖ S(Prv(SM), (MHdr ‖ Mcnt)) |
| | Mcnt = Session_ID ‖ Key_Pairing_ID ‖ Cert(SM) ‖ H(Prev_IHK) |
| Key Response | MHdr ‖ Session_ID ‖ E(Pub(SM), IHK) ‖ S(Prv(AP), (MHdr ‖ Mcnt)) |
| | Mcnt = Session_ID ‖ IHK |

In this instance, notation of the configuration of Table 1 is provided as below.

TABLE 2 notation of key request message and the key response message

| Notation | Description |
|---|---|
| Pub(X) | Public key of X |
| Prv(X) | Private key of X |
| E(k, m) | Encryption of a message m using a key k |
| S(k, m) | Digital signature of a message m using a key k |
| H(m) | SHA-1 hash of a message m |
| X‖Y | Concatenation of X and Y |
| Cert(X) | X.509v3 certificate of X |
| MHdr | Message header |
| Mcnt | Message payload |

According to an embodiment of the present invention, since the hash value may be added to the key request message, it may be ascertained that the SM 200 may perform fast re-authentication, and the AP 100 may extract keying information about a previous session with respect to a corresponding SM from a database using the key pairing identifier and the IHK about the previous session (Prev_IHK) extracted from the received message.

When the fast re-authentication with respect to the corresponding SM is determined to be performed, the AP 100 may include IHK values, which are to be used for authentication with respect to messages to be transmitted, in the key response message, and transmit the key response message to the SM 200.

Hereinafter, a re-authentication method in a DCAS is described in an aspect of the AP 100.

Figure 3:
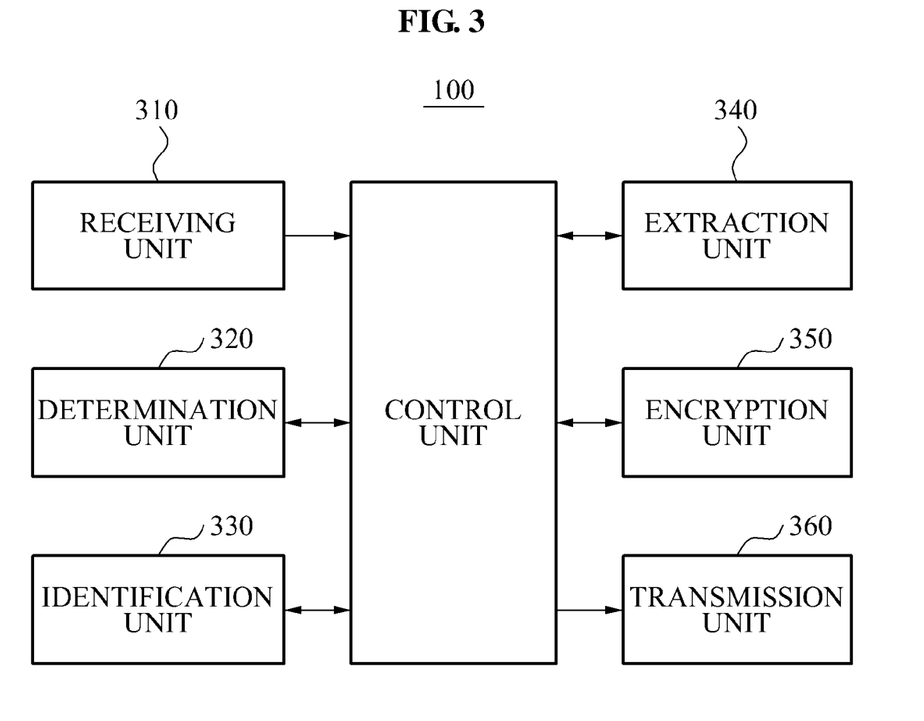
FIG. 3 is a block diagram illustrating a configuration of an Authentication Proxy (AP) of a re-authentication apparatus in a DCAS according to an embodiment of the present invention.

FIG. 3 is a block diagram illustrating a configuration of the AP 100 of a re-authentication apparatus in a DCAS according to an embodiment of the present invention.

Figure 4:
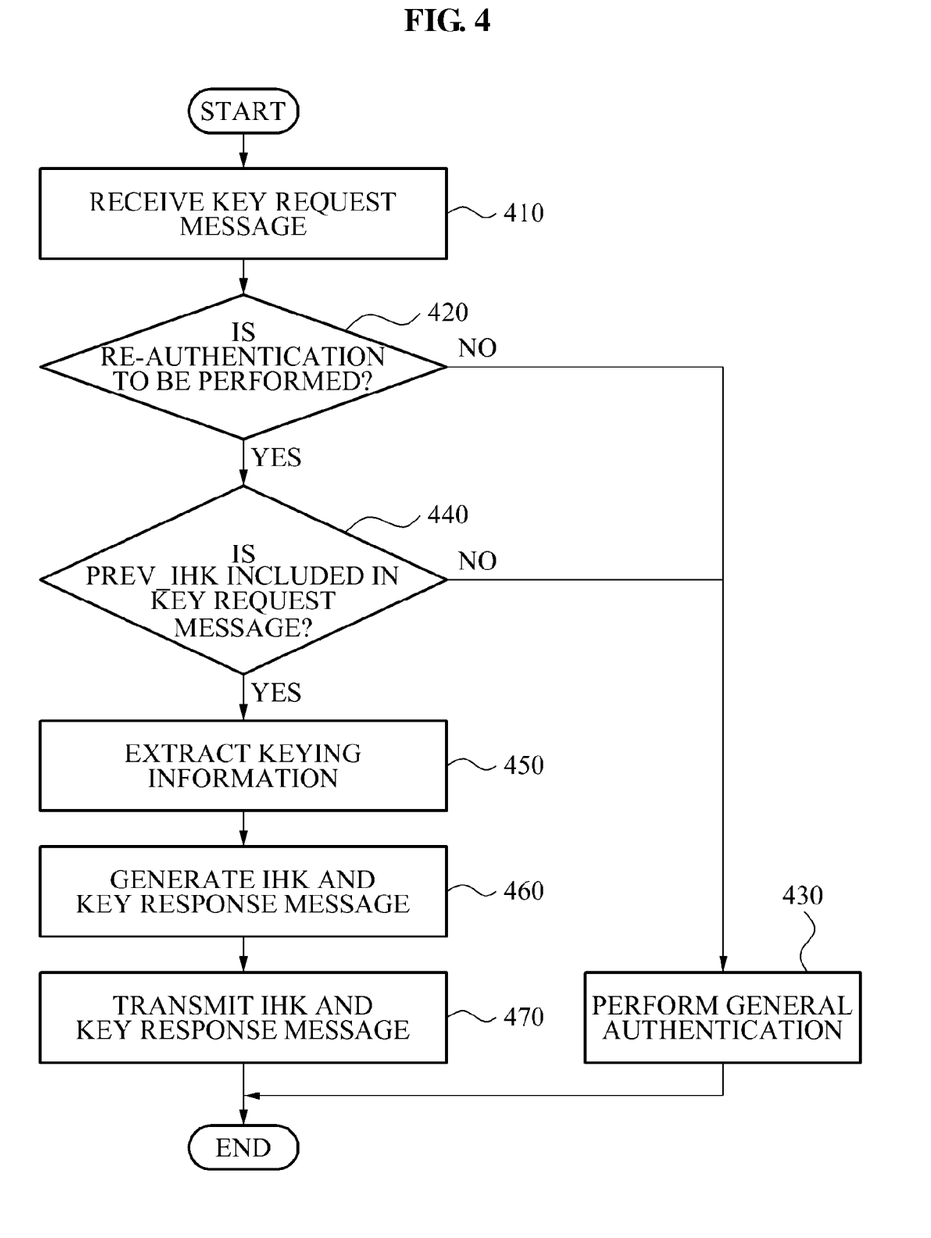
FIG. 4 is a flowchart illustrating a re-authentication method using an AP in a DCAS according to an embodiment of the present invention.

FIG. 4 is a flowchart illustrating a re-authentication method using the AP 100 in a DCAS according to an embodiment of the present invention.

The AP 100 may include a receiving unit 310, a determination unit 320, an identification unit 330, an extraction unit 340, an encryption unit 350, and a transmission unit 360 and a control unit.

In operation 410, the receiving unit 310 may receive a key request message from the SM 200.

In operation 420, the determination unit 320 may determine whether to perform re-authentication depending on downloading of an SM client image.

In operation 430, the determination unit 320 may determine whether a hash value 'H(Prev_IHK)' of an IHK about a previous session exists in the key request message when parsing the key request message, and when the hash value does not exist, may determine that the SM 200 attempts to perform authentication in a virgin state, and may perform general authentication.

In operation 440, when the hash value exists in the key request message, the determination unit 320 may determine whether to follow a fast re-authentication standard.

That is, when an IHK about the previous session (Prev_IHK) is included in the key request message, the determination unit 230 may determine to perform re-authentication.

In this instance, the fast re-authentication standard may include a number of authentication events, a resource state in the AP 100, a reuse period of key-related information generated in the previous session, and the like.

In operation 450, the identification unit 330 may identify an SM identifier (SM_ID) using the key request message, when the re-authentication is performed as a result of the determination, and the extraction unit 340 may retrieve previous session information corresponding to the SM identifier and extract keying information about the previous session information.

For example, the extraction unit 340 may extract the SM identifier from a key pairing identifier (Key_Pairing_ID) value in the key request message, and extract key-related information about the previous session from a database using the hash value. Information associated with the SM identifier may be stored in the database.

In this instance, the hash value may be used as a factor to ascertain that the AP 100 and the SM 200 perform in the previous session.

Also, the encryption unit 350 may control an encryption key about the SM client image to be reused. Here, the SM client image may be encrypted in the previous session based on the previous session information using the keying information.

For example, the encryption unit 350 may encrypt an IHK.

In operation 460, the AP 100 may generate a new IHK value for message authentication, and generate a key response message including the IHK. In operation 470, the transmission unit 360 may transmit the encrypted IHK to the SM 200. Accordingly, the fast re-authentication may be performed.

When the AP 100 performs a request for purchase information (Purchase Report_REQ flag) using the DD message, the fast re-authentication may be performed, and the SM 200 may transmit purchase information to the AP 100 without exchanging the DownloadInfo message and the DownloadConfirm message.

Hereinafter, a re-authentication method is described in detail in an aspect of the SM 200 of the re-authentication apparatus in a DCAS.

Figure 5:
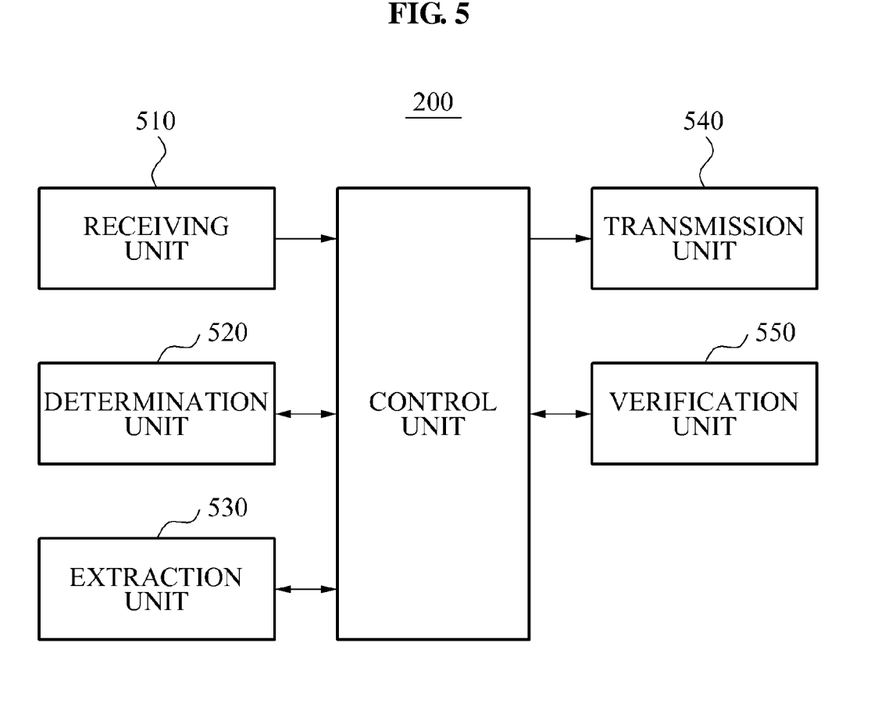
FIG. 5 is a block diagram illustrating a configuration of a Secure Micro (SM) of a re-authentication apparatus in a DCAS according to an embodiment of the present invention.

FIG. 5 is a block diagram illustrating a configuration of the SM 200 of the re-authentication apparatus in the DCAS according to an embodiment of the present invention.

Figure 6:
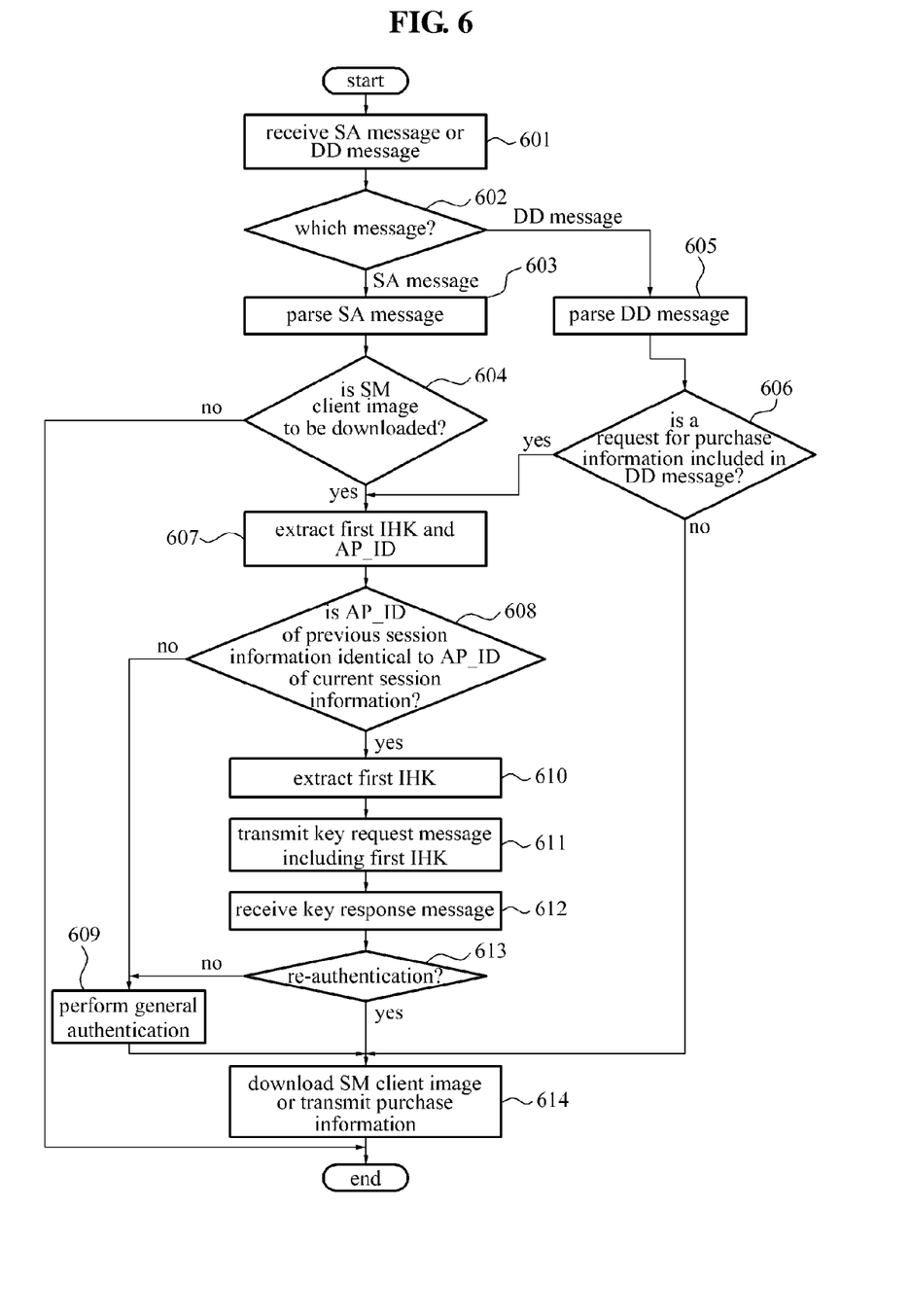
FIG. 6 is a flowchart illustrating a re-authentication method using an SM in a DCAS according to an embodiment of the present invention.

FIG. 6 is a flowchart illustrating a re-authentication method using the SM 200 in a DCAS according to an embodiment of the present invention.

The SM 200 may include a receiving unit 510, a determination unit 520, an extraction unit 530, a transmission unit 540, and a verification unit 550 a control unit.

In operation 601, the receiving unit 510 may receive an SA message or a DD message from the AP 100.

In operation 602, the determination unit 520 may determine which message is received and separately control based on the SA message and the DD message.

That is, the SM 200 may compare a version of a SM client image, which is being operated in a DCAS network, with a version of an image which is installed in the SM 200 and operated, by parsing the SA message and the DD message. Accordingly, the SM 200 may ascertain whether to download for a SM client image or whether a request for purchase information is received from the AP 100.

In operation 603, the determination unit 520 may parse the SA message. In operation 604, the determination unit 520 may determine whether to download the SM client image. When it is determined that the downloading is not required, the determination unit 520 may delete the SA message and finish the DCAS message process.

In operation 605, the determination unit 520 may parse the DD message. In operation 606, the determination unit 520 may determine whether the request for purchase information is included in the DD message. When the request for purchase information is not included, the determination unit 520 may remove the DD message and finish the DCAS message process.

In operation 607, when the SM client image is required to be downloaded, the extraction unit 530 may extract an AP identifier (AP_ID) of previous session information and a first IHK.

For example, when the SA message is received, the determination unit 520 may determine that the SM client image is required to be downloaded, and control the extraction unit 530 to extract the previous session information.

For another example, when the DD message is received, the determination unit 520 may determine whether the request for purchase information is included in the DD message, and control the extraction unit 530 to extract the AP identifier (AP_ID) of the previous session information and the first IHK. In this instance, the transmission unit 540 may transmit the purchase information to the AP 100.

In operation 608, the determination unit 520 may compare the AP identifier of the previous session information with an AP identifier of current session information.

In this instance, when the AP identifier of the previous session information is different from the AP identifier of the current session information, or when the previous session information does not exist, which is in a virgin state, the determination unit 520 may control a general authentication process to be performed in operation 609.

However, when the AP identifier of the previous session information is identical to the AP identifier of the current session information, the determination unit 520 may control the extraction unit 530 to extract the first IHK about the previous session information in operation 610.

For example, the extraction unit 530 may extract the AP identifier and an IHK value by retrieving the previous session information. Also, the extraction unit 530 may compare an identifier of an AP, which is transmitting the SA message, with the extracted AP identifier and the IHK, and ascertain whether an AP zone changes. When the AP zones are different, it may be determined that the previous session information, stored in the SM 200, is different from the connected AP. Accordingly, the general authentication process may be performed.

In operation 611, the transmission unit 540 may include the first IHK about the previous session information in a key request message, and transmit the key request message to the AP 100 corresponding to the extracted AP identifier.

For example, when the SA message is received in a same AP zone, the transmission unit 540 may hash the IHK value, which is shared in a previous session, include the hashed IHK value in the key request message, and transmit the key request message, in order to enable the connected AP to determine whether to perform fast re-authentication.

Also, the receiving unit 510 may download the SM client image through the re-authentication process using the first IHK and a second IHK received from the AP 100.

For example, the SM 200 may receive a key response message from the AP 100 in operation 612. Also, the SM 200 may determine whether to perform fast re-authentication in operation 613. In operation 614, when the fast re-authentication is required from the AP 100, the SM 200 may download the SM client image using stored keys associated with the previous session and a newly received IHK value, or transmit purchase information to the AP 100.

Also, the verification unit 550 may verify a signature in the SM client image using a certificate of the AP 100. The certificate may be stored in the previous session.

According to an embodiment of the present invention, when an authentication event due to downloading of a number of SM client images occurs, a significant load of an AP in a DCAS headend may be prevented, and a quick download service of SM client images may be provided.

Also, according to an embodiment of the present invention, a fast re-authentication may be quickly and efficiently performed in a DCAS protocol associated with SM client image download and key sharing based on mutual authentication between an SM and an AP server.

Also, according to an embodiment of the present invention, a significant overload in a DCAS headend system may be prevented, and purchase information may be efficiently transmitted/received via a security channel.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A re-authentication apparatus in a Downloadable Conditional Access System (DCAS), the re-authentication apparatus comprising:
   a processor; and
   a memory storing instructions that, when executed by the processor, cause the processor to:
      receive a key request message from a Secure Micro (SM) within the DCAS;
      determine that an SM client image is to be downloaded;
      identify an SM identifier using the key request message;
      retrieve previous session information corresponding to the SM identifier and extract keying information of the previous session information;
      control an encryption key of the SM client image to be reused, the SM client image being encrypted in a previous session based on the previous session information using the keying information; and
      perform re-authentication when an Individual Hashed Message Authentication Code (HMAC) Key (IHK) of the previous session is included in the key request message.

2. The re-authentication apparatus of claim 1, wherein the IHK of the SM client image is encrypted.

3. The re-authentication apparatus of claim 2, wherein the memory further stores instructions that, when executed by the processor, cause the processor to:
   transmit the encrypted IHK to the SM.

4. A re-authentication apparatus in a Downloadable Conditional Access System (DCAS), the re-authentication apparatus comprising:
   a processor; and
   a memory storing instructions that, when executed by the processor, cause the processor to:
      receive a Security Announcement (SA) message or a DCAS Download (DD) message within the DCAS from an Authentication Proxy (AP);
      determine that a Secure Micro (SM) client image is to be downloaded, when the SA message or the DD message is received;
      extract a first Individual Hashed Message Authentication Code (HMAC) Key (IHK) and an AP identifier of previous session information;
      transmit the first IHK of the previous session information to the AP corresponding to the extracted AP identifier,
      wherein the SM client image is downloaded using the first IHK and a second IHK received from the AP;
      wherein, when the DD message is received, the processor executes instructions to:
         determine whether a request for purchase information is included in the DD message,
         extract the AP identifier and the first IHK of the previous session information, and transmit the first IHK of the previous session information to the AP.

5. The re-authentication apparatus of claim 4, wherein the memory further stores instructions that, when executed by the processor, cause the processor to:
   perform general authentication in a virgin state where the previous session information is non-existent.

6. The re-authentication apparatus of claim 4, wherein, when the AP identifier of the previous session information and an AP identifier of current session information are identical, the first IHK of the previous session information is extracted.

7. The re-authentication apparatus of claim 4, wherein the memory further stores instructions that, when executed by the processor, cause the processor to:
   authenticate a signature in a key response message using a certificate of the AP, the certificate being stored in the previous session information.

8. A re-authentication method in a Downloadable Conditional Access System (DCAS), the re-authentication method comprising:
   receiving a key request message from an Secure Micro (SM) within the DCAS;
   determining that an SM client image, is to be downloaded;
   identifying an SM identifier using the key request message;
   retrieving previous session information corresponding to the SM identifier and extracting keying information of the previous session information;
   controlling an encryption key of the SM client image to be reused, the SM client image being encrypted in a previous session based on the previous session information using the keying information; and
   performing re-authentication when an Individual Hashed Message Authentication Code (HMAC) Key (IHK) of the previous session is included in the key request message.

9. The re-authentication method of claim 8, further comprising:
   encrypting the IHK of the SM client image; and
   transmitting the encrypted IHK to the SM.

10. A re-authentication method in a Downloadable Conditional Access System (DCAS), the re-authentication method comprising:

receiving a Security Announcement (SA) message or a DCAS Download (DD) message from an Authentication Proxy (AP) within the DCAS;

determining that a Secure Micro (SM) client image is to be downloaded, when the SA message or the DD message is received;

extracting a first Individual Hashed Message Authentication Code (HMAC) Key (IHK) and an AP identifier of previous session information;

transmitting the first IHK of the previous session information to the AP corresponding to the extracted AP identifier; and downloading the SM client image using the first IHK and a second IHK received from the AP;

wherein, when the DD message is received:
   determining whether a request for purchase information is included in the DD message;
   controlling the AP identifier and the first IHK of the previous session information to be extracted, when the request for purchase information is included in the DD message; and
   transmitting the first IHK of the previous session information to the AP.

11. The re-authentication method of claim 10, further comprising: extracting the first IHK of the previous session information when the AP identifier of the previous session information and an AP identifier of current session information are identical.

12. The re-authentication method of claim 10, further comprising:
   authenticating a signature in a key response message using a certificate of the AP, the certificate being stored in the previous session information.

\* \* \* \* \*